(12) United States Patent
He et al.

(10) Patent No.: US 11,168,682 B2
(45) Date of Patent: Nov. 9, 2021

(54) METHOD TO DETERMINE THE REASONABLE DESIGN AREA OF ROTOR PROFILE OF ROOTS PUMP AND ITS APPLICATION

(71) Applicant: Jiangnan University, Wuxi (CN)

(72) Inventors: Xueming He, Wuxi (CN); Hainan Huang, Wuxi (CN); Zhenchao Liu, Wuxi (CN); Jiachuan Yu, Wuxi (CN); Ping Liu, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 17/137,512

(22) Filed: Dec. 30, 2020

(65) Prior Publication Data

US 2021/0115918 A1    Apr. 22, 2021

Related U.S. Application Data

(63) Continuation of application No. PCT/CN2019/114012, filed on Oct. 29, 2019.

(30) Foreign Application Priority Data

Dec. 28, 2018 (CN) .......................... 201811618863.X (51) Int. Cl.
*F01C 21/10* (2006.01)
*F04C 2/08* (2006.01)
(Continued)

(52) U.S. Cl.
CPC .............. *F04C 2/126* (2013.01); *F04C 2/084* (2013.01); *F04C 18/084* (2013.01); *G06F 17/10* (2013.01);
(Continued)

(58) Field of Classification Search
CPC ...... F01C 21/106; F04C 2/084; F04C 18/084; F04C 2250/301
See application file for complete search history.

(56) References Cited

U.S. PATENT DOCUMENTS 3,089,638 A * 5/1963 Rose ........................ F01C 1/126
                                                          418/150
5,152,684 A * 10/1992 Steffens ................ F04C 18/126
                                                          418/150

(Continued)

FOREIGN PATENT DOCUMENTS

CN       103062057 A    4/2013
CN       104963855 A    10/2015

(Continued)

*Primary Examiner* — Deming Wan
(74) *Attorney, Agent, or Firm* — IPro, PLLC (57) ABSTRACT

The disclosure discloses a method for determining reasonable design area of roots pump rotor profile of roots pump and its application, and belongs to the field of mechanical design. According to the method of the disclosure, after a relation between the roots pump rotor profile and performance parameters is established, constraint conditions for avoiding a closed volume and undercutting are further determined, so that a reasonable design region of a roots pump rotor blade peak curve is determined. Reference is given when the roots pump rotor profile is designed, i.e., the rotor profile with the blade peak curve being not within the reasonable design region inevitably causes the problem of closed volume or undercutting in application, so that the design of the rotor profile that causes the closed volume or undercutting can be avoided when the roots pump rotor profile is designed. The problem that the design unreasonableness of the rotor profile is not found until the design is completed is solved, so that the design efficiency of the rotor profile is improved.

6 Claims, 9 Drawing Sheets

(51) Int. Cl.
  *F04C 18/08* (2006.01)
  *F04C 2/12* (2006.01)
  *G06F 17/10* (2006.01)

(52) U.S. Cl.
  CPC .... *F04C 2240/20* (2013.01); *F04C 2250/301* (2013.01)

(56) References Cited

U.S. PATENT DOCUMENTS

2010/0254846 A1* 10/2010 Hirano ................. F04C 18/126
  418/206.5
2011/0223051 A1* 9/2011 Giuseppe ................ F04C 2/084
  418/206.5

FOREIGN PATENT DOCUMENTS

| CN | 204827918 U | 12/2015 |
| CN | 205478296 U | 8/2016 |
| CN | 205578260 U | 9/2016 |
| CN | 107725364 A | 2/2018 |
| CN | 109555681 A | 4/2019 |
| EP | 0472751 A1 | 3/1992 |
| JP | 2006266234 A | 10/2006 |

\* cited by examiner

METHOD TO DETERMINE THE REASONABLE DESIGN AREA OF ROTOR PROFILE OF ROOTS PUMP AND ITS APPLICATION

TECHNICAL FIELD

The disclosure relates to a method for determining reasonable design area of roots pump rotor profile of roots pump and its application, and belongs to the field of mechanical design.

BACKGROUND

A roots pump refers to a positive displacement pump which is internally provided with two blade rotors synchronously rotating in opposite directions, and has fine gaps between rotors and between the rotors and an inner wall of a pump case to avoid mutual contact. As general machinery, the roots pump is widely applied to industries of chemical industry, papermaking, power generation, food, and the like attributing to self structure and performance characteristics.

A pair of rotors of the roots pump, as key parts of the roots pump, have great influence on the performance of the roots pump. Through the study on performance parameters of the roots pump by three typical rotor profiles (i.e., arc, involute and cycloidal curve) on the market, it is found that the higher a utilization coefficient of the rotor area is, the greater the air quantity and the pumping rate of the roots pump are, but the problems of closed volume and undercutting are also needed to be considered. Therefore, the reasonable design region of the rotor profile needs to be defined to solve the possible problems of closed volume, undercutting, etc.

Generally, after the design of the rotor profile is completed, whether the designed rotor profile meets the conditions of no closed volume, no undercutting and the like can be detected according to parameter data of the designed rotor profile. However, this detection behavior relies on the parameter data of the designed rotor profile. Before a design process, a blade peak curve cannot be defined, this may cause a result that the design of the blade peak curve data is unreasonable from the beginning, but the design unreasonableness is not found until the design of the curve is completed, so that the design efficiency of the rotor profile is reduced.

SUMMARY

In order to solve the problem that closed volume and undercutting of rotors caused by improper design parameter selection of a roots pump rotor profile is found after the design is completed in the prior art, the disclosure provides a method for determining reasonable design area of roots pump rotor profile of roots pump and its application, so that whether the designed roots pump rotor profile will generate the problems of closed volume and undercutting or not can be pre-judged according to the method when the roots pump rotor profile is designed, so that corresponding modification can be made, the designed roots pump rotor profile can avoid the problems of closed volume and undercutting as much as possible, and the design qualification rate and the design efficiency of the roots pump rotor profile are improved.

A method for determining reasonable design area of roots pump rotor profile of roots pump includes:

step 1: establishing a relation of the roots pump rotor profile and a performance parameter before a roots pump rotor profile blade peak curve is designed, wherein the establishing the relation of the roots pump rotor profile and the performance parameter includes:

selecting a pumping rate of a roots pump as an index for measuring the performance of the roots pump, and establishing a relation of the pumping rate and the performance parameter of the roots pump, wherein the established relation of the pumping rate and the performance parameter of the roots pump includes:

$$s_{th} = 2V \cdot \frac{n}{60} \cdot 10^{-6} = 2 \cdot 10^{-6} \pi R_a^2 L \frac{n}{60} \lambda \text{ and,} \quad (3)$$

$$\lambda = \frac{\pi R_a^2 - S_r}{\pi R_a^2}, \quad (4)$$

wherein $s_{th}$ is the pumping rate of the roots pump; V is a volume of a medium discharged by the roots pump when one rotor of the roots pump rotates for a circle; n is a rotating speed of the rotor; $\lambda$ is a rotor area utilization coefficient; $R_a$ is a rotor tip radius; L is a rotor length; and $S_r$ refers to an area of a single roots pump rotor;

step 2: determining constraint conditions for avoiding the closed volume;

step 3: determining constraint conditions for avoiding undercutting; and step 4: determining the reasonable design region of the roots pump rotor blade peak curve according to step 1 to step 3.

Optionally, a formula for calculating the area $S_r$ of the single roots pump rotor is:

$$S_r = 6 S_b \quad (5),$$

wherein $S_b$ is an area of half tooth of the rotor. For convenient calculation, the $S_b$ is divided into three regions for area calculation, the areas of the three regions are sequentially recorded as $S_1$, $S_2$ and $S_3$ from the center to the edge of the roots pump, and calculation formulas are as follows:

$$S_1 = \frac{x_e * y_e}{2} = \frac{(H - R_a)^2 \sin 4\gamma}{4}, \quad (6)$$

$$S_2 = \int_{x_e}^{x_c} g(x)dx = \int_{(H-R_a)\cos(2\gamma)}^{R\cos\gamma} g(x)dx \text{ and,} \quad (7)$$

$$S_3 = \int_{x_c}^{x_a} f(x)dx = \int_{R\cos\gamma}^{R_a} f(x)dx, \quad (8)$$

so $$S_b = \quad (9)$$
$$S_1 + S_2 + S_3 = \frac{(H - R_a)^2 \sin 4\gamma}{4} + \int_{(H-R_a)\cos(2\gamma)}^{R\cos\gamma} g(x)dx + \int_{R\cos\gamma}^{R_a} f(x)dx.$$

In Formula 9, R is a pitch radius, and is half of a center distance H of two rotors of the roots pump; $(x_e, y_e)$ is a starting point coordinate of a blade valley curve, and $(x_c, y_c)$ is an ending point coordinate of the blade valley curve; the blade valley curve is connected to the blade peak curve, so that an ending point of the blade valley curve is a starting point of the blade peak curve, and $(x_a, y_a)$ is an ending point coordinate of the blade peak curve; and g(x) represents a function expression of the blade valley curve, and ƒ(x) represents a function expression of the blade peak curve.

γ is an included angle between connecting lines of the starting and ending points of the blade peak curve or the blade valley curve with a circle center of the pitch circle, the size of γ is relevant to a rotor tooth number Z, and a calculation formula is Formula (1):

$$\gamma = \frac{\pi}{2Z}. \quad (1)$$

Optionally, in step 2, the determining constraint conditions for avoiding the closed volume includes:

taking an arbitrary point on the roots pump rotor blade peak curve to make a normal line of the blade peak curve at the point, and setting a slope of the normal line to be $k_1$, the coordinate of an intersection point of the normal line and a pitch circle arc to be $(x_1, y_1)$, and $$\begin{cases} x_1 = x_1(t) \\ y_1 = y_1(t) \end{cases}; \quad (10)$$

and making a normal line $B_1 B'_1$ on a point $B_1$ on the blade peak curve, and setting the coordinate of the point $B_1$ is $(x_b, y_b)$, then the constraint conditions for avoiding the closed volume being:

$$\begin{cases} (k_1^2 + 1)R^2 - (k_1 x_b - y_b)^2 \geq 0 \\ \frac{dx_1}{dt} \leq 0 \\ y_1 \geq 0 \end{cases} \quad (15)$$

Optionally, in step 3, the determining constraint conditions for avoiding undercutting includes:

at an arbitrary point of an line of action, making a normal line of the line of action on the point, and setting a slope of the normal line to be $k_2$, and the coordinate of an intersection point of the normal line and $O_1 O_2$ to be $(X_1, Y_1)$, then the constraint conditions for avoiding undercutting being:

$$\begin{cases} X_1 - \frac{Y_1}{k_2} \geq 0 \\ X_1 - \frac{Y_1}{k_2} \leq H \end{cases}, \quad (17)$$

wherein H is a center distance of two rotors, and $O_1 O_2$ is a connecting line of center points of the two rotors.

Optionally, a left boundary of the blade peak curve for avoiding undercutting meets Formula (25), and x and y are respectively a transverse coordinate and a longitudinal coordinate of each point in the left boundary of the blade peak curve:

$$\left(y - R\sin\frac{\pi}{2Z}\right) - k_3\left(x - R\cos\frac{\pi}{2Z}\right) \geq 0. \quad (25)$$

In the Formula, $$x \in \left[R\cos\frac{\pi}{2Z}, (Ra - R)\cos\left(\arcsin\left(\frac{R_a}{R} - 1\right) - \arcsin\left(\frac{-\sqrt{2 - 2\cos\left(\frac{\pi}{2Z}\right)}}{2}\right)\right) + R\right], \text{ and}$$

$$k_3 = \cot\left[\arcsin\left(\frac{-\sqrt{2 - 2\cos\left(\frac{\pi}{2Z}\right)}}{2}\right) - \arcsin\left(\frac{R_a}{R} - 1\right)\right].$$

Optionally, in step 4, the determining the reasonable design region of the roots pump rotor blade peak curve according to step 1 to step 3 includes:

drawing a region range of the roots pump blade peak curve according to the constraint conditions determined in step 1 to step 3.

Optionally, the roots pump rotor profile includes an arc type rotor profile, a cycloidal type rotor profile or an involute type rotor profile.

Optionally, the method designs the roots pump rotor profile by using the method above.

The disclosure has the following beneficial effects:

According to the method for determining the reasonable design region of the roots pump rotor profile provided by the disclosure, after the relation of the roots pump rotor profile and the performance parameter is established, the constraint conditions for avoiding the closed volume and undercutting are further determined, so that the reasonable design region of the roots pump rotor blade peak curve is determined. Reference is given when the roots pump rotor profile is designed, i.e., the rotor profile with the blade peak curve being not within the reasonable design region definitely causes the problems of closed volume or undercutting in application, so that the design of the rotor profile that causes the closed volume or undercutting can be avoided when the roots pump rotor profile is designed. The problem that the design unreasonableness of the rotor profile is not found until the design is completed is solved, so that the design efficiency of the rotor profile is improved.

BRIEF DESCRIPTION OF FIGURES

In order to more clearly illustrate the technical solutions of the embodiments of the disclosure, the drawings used in the description of the embodiments are briefly described below, and it is obvious that the drawings in the description below are only some embodiments of the disclosure, and a person of ordinary skill in the art can obtain other drawings from these drawings without any creative effort.

DETAILED DESCRIPTION

In order to make objectives, technical solutions, and advantages of the disclosure more apparent, implementations of the disclosure will be described in further detail with reference to the drawings.

Embodiment 1

Figure 1A:
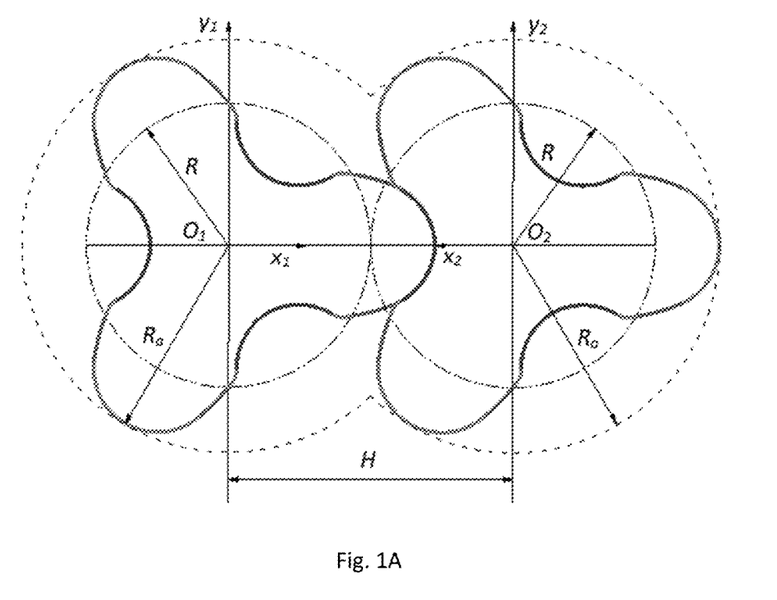
FIG. 1A is a profile composition diagram of two rotors of roots pump.
Figure 1B:
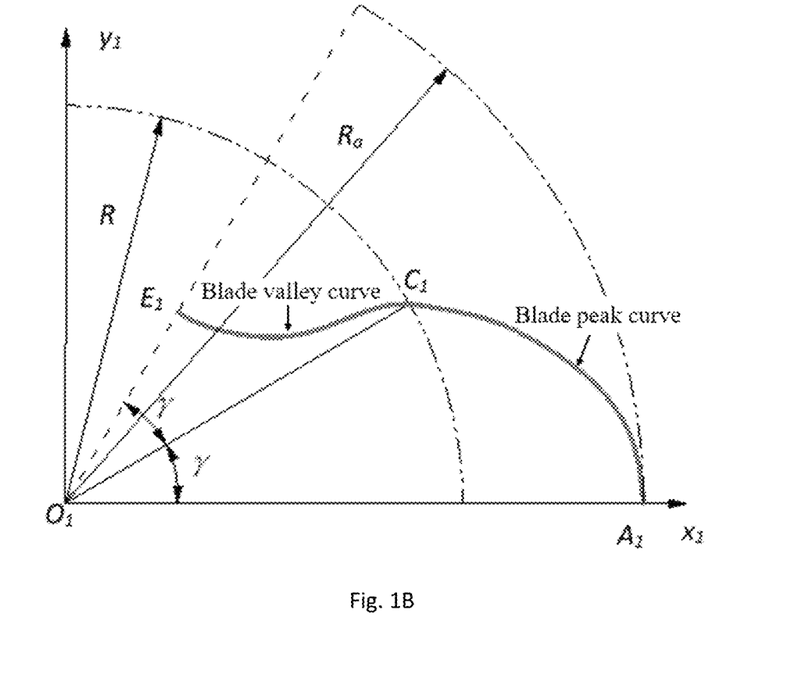
FIG. 1B is a profile composition diagram of the half tooth of roots pump.

The present embodiment provides a method for determining reasonable design area of roots pump rotor profile of roots pump. Referring to FIG. 1A and FIG. 1B, the method includes the following steps.

Step 1: A relation of the roots pump rotor profile and a performance parameter is established. A pumping rate of a roots pump is adopted as an index for measuring the performance of the roots pump. The roots pump is provided with two rotors. Each rotor is provided with Z teeth. Z is an integer greater than or equal to 2. The embodiment of the disclosure is illustrated with Z=3 as an example.

As shown in FIG. 1A, the two rotors of the roots pump are the same in shape. Further, the rotors have the same tooth profile on each tooth. The tooth profile on each tooth is axisymmetric. As shown in FIG. 1B, the tooth profile on half tooth consists of a blade peak curve and a blade valley curve, by using a pitch circle as a boundary, a portion beyond the pitch circle is referred to as the blade peak curve, and a portion within the pitch circle is referred to as the blade valley curve.

In FIG. 1A and FIG. 1B: $R_a$ is a rotor tip radius; R is a pitch radius, and R is half of a center distance H of two rotors; $\gamma$ is an included angle between connecting lines of starting and ending points of the blade peak curve (the blade valley curve) with a circle center of the pitch circle, the size of $\gamma$ is relevant to a rotor tooth number Z, and a calculation formula is Formula (1):

$$\gamma = \frac{\pi}{2Z}. \tag{1}$$

A calculation formula of a volume of a medium discharged by the roots pump when one rotor rotates for a circle is Formula (2):

$$V = \pi R_a^2 L \lambda \tag{2}$$

In Formula (2), $R_a$ is a rotor tip radius, L is a rotor length, and $\lambda$ is a rotor area utilization coefficient.

The roots pump is provided with two rotors. According to Formula (2), the pumping rate of the roots pump can be obtained, shown as Formula (3):

$$s_{th} = 2V \cdot \frac{n}{60} \cdot 10^{-6} = 2 \cdot 10^{-6} \pi R_a^2 L \frac{n}{60} \lambda. \tag{3}$$

In Formula (3), n is a rotating speed of the rotor.

Figure 13:
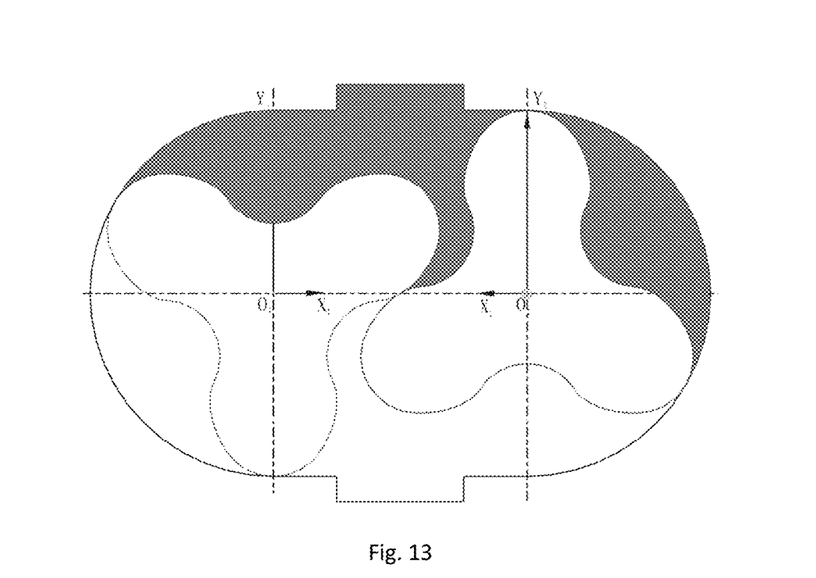
FIG. 13 is a schematic diagram of a basic volume of a rotor.

In Formula (2) and Formula (3), the rotor area utilization coefficient $\lambda$ is a ratio of a cross section area of a basic volume of the rotor to a tip circle area, and its calculation formula is Formula (4). In a rotor rotation process, i.e., a medium transfer process, a medium in a cavity communicated with an inlet is gradually sealed in a relatively closed volume along with the rotor rotation, and this volume is the basic volume of the rotor, as shown by shadow in FIG. 13.

$$\lambda = \frac{\pi R_a^2 - S_r}{\pi R_a^2}. \tag{4}$$

In Formula (4), $S_r$ refers to an area of a single roots pump rotor, and the calculation formula is as shown in Formula (5):

$$S_r = 6S_b \tag{5}$$

Figure 2:
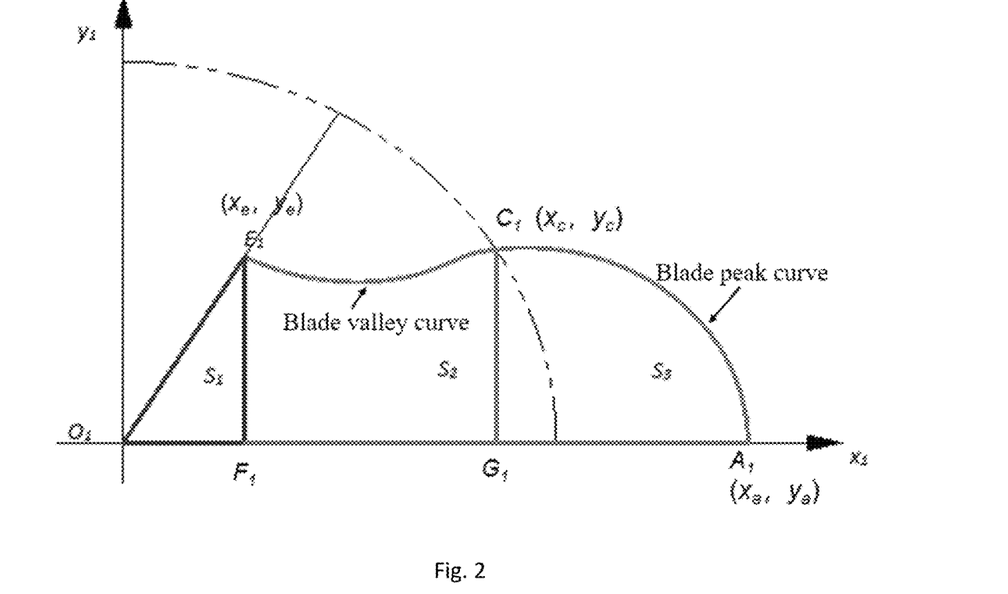
FIG. 2 is a schematic area division diagram of a rotor.

In Formula (5), $S_b$ refers to an area of half tooth of the rotor. Referring to FIG. 2, a calculation process is as follows: ($x_e$, $y_e$, $x_c$ and $x_a$ in Formula 6 to Formula 8 are respectively marked in FIG. 2)

$$S_1 = \frac{x_e * y_e}{2} = \frac{(H - R_a)^2 \sin 4\gamma}{4}, \tag{6}$$

$$S_2 = \int_{x_e}^{x_c} g(x)dx = \int_{(H-R_a)\cos(2\gamma)}^{R \cos \gamma} g(x)dx, \tag{7}$$

$$S_3 = \int_{x_c}^{x_a} f(x)dx = \int_{R \cos \gamma}^{R_a} f(x)dx, \text{ and} \tag{8}$$

$$S_b = S_1 + S_2 + S_3 \tag{9}$$
$$= \frac{(H - R_a)^2 \sin 4\gamma}{4} + \int_{(H-R_a)\cos(2\gamma)}^{R \cos \gamma} g(x)dx + \int_{R \cos \gamma}^{R_a} f(x)dx.$$

From Formula (3), Formula (4) and Formula (5), it can be known that under the condition that the tip radius $R_a$ is unchanged, the smaller the area $S_r$ of the single roots pump rotor is, the greater the rotor area utilization coefficient $\lambda$ is, and the pumping rate of the roots pump at the same rotating speed is higher, i.e., the discharge efficiency of the roots pump is higher.

Therefore, during the design of the roots pump rotor profile, after the size of the rotor tip circle is determined, the area of the rotor should be as small as possible. According to FIG. 2, the rotor area utilization coefficient $\lambda$ is obtained through Formulas (6), (7), (8) and (9).

Step 2: Constraint conditions for avoiding the closed volume are determined: to avoid the closed volume, total engagement of the rotors is needed in the rotor rotation process.

Figure 3:
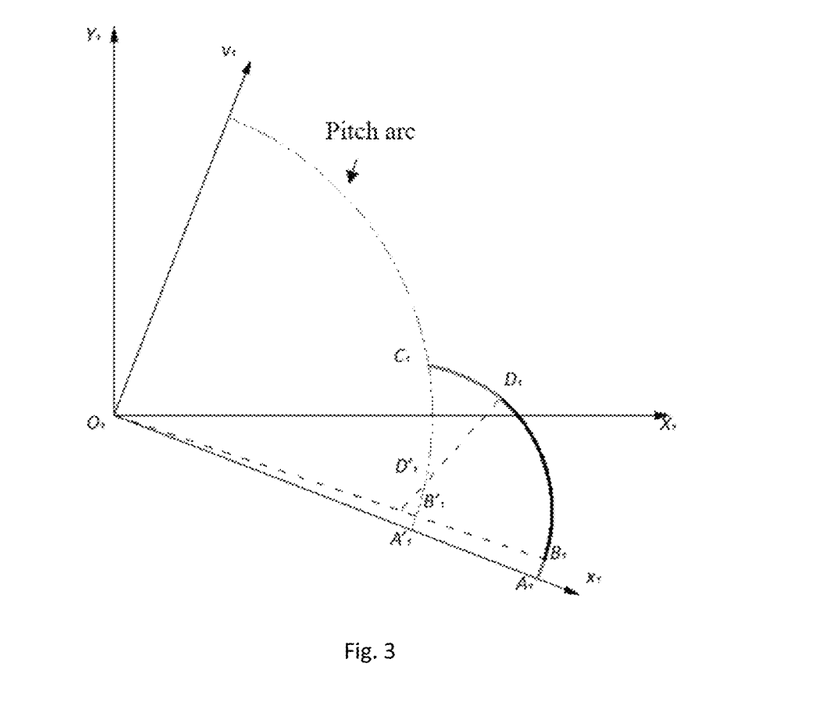
FIG. 3 is a schematic diagram of design of a blade peak curve.

As shown in FIG. 3, by passing any points $B_1$ and $D_1$ on the blade peak curve, normal lines of the blade peak curve on the points are made and respectively intersect with the pitch circle arc $A'_1C_1$ at $B'_1$ and $D'_1$. According to an engagement principle, it can be known that along with the rotor rotation, when the point $B'_1$ rotates to an axis $O_1X_1$ of a static coordinate system, the point $B_1$ will become an engaged point of the two rotors at this moment. When the point $D'_1$ rotates to $O_1X_1$ of the static coordinate system, the point $D_1$ will become an engaged point of the two rotors at this moment.

Figure 4A:
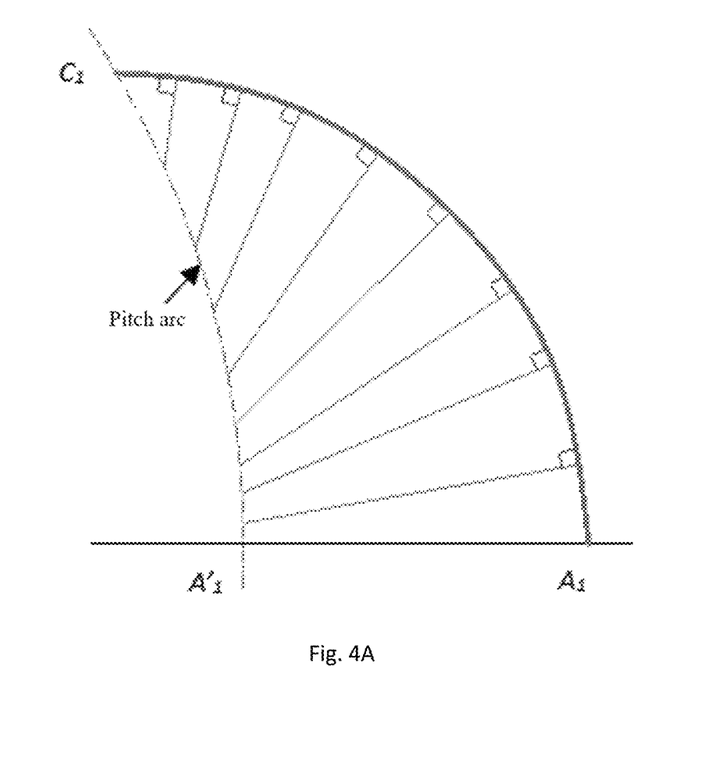
FIG. 4A is a schematic diagram of a curve of the blade peak curve mapped on a pitch circle arc under normal engagement state.
Figure 4B:
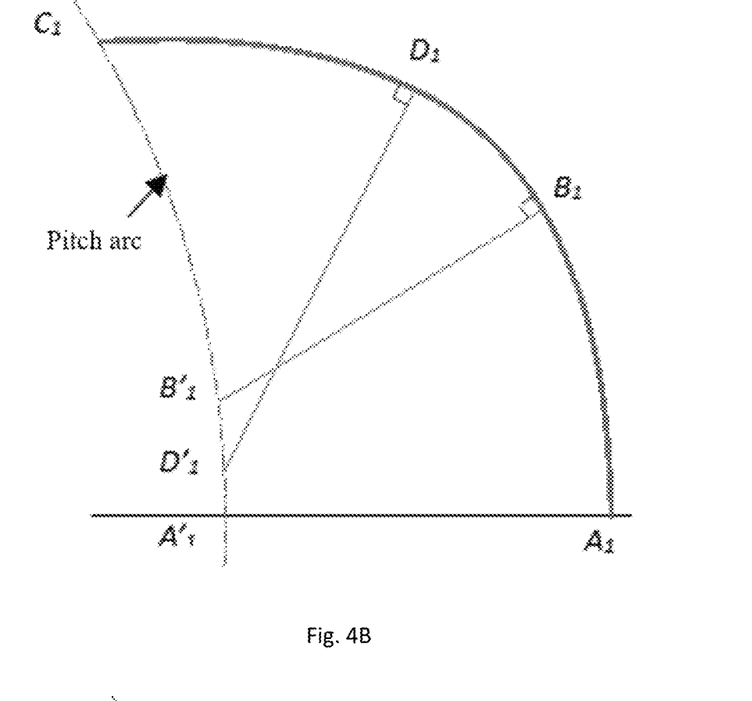
FIG. 4B is a schematic diagram of a curve of the blade peak curve mapped on a pitch circle arc under closed volume state.
Figure 4C:
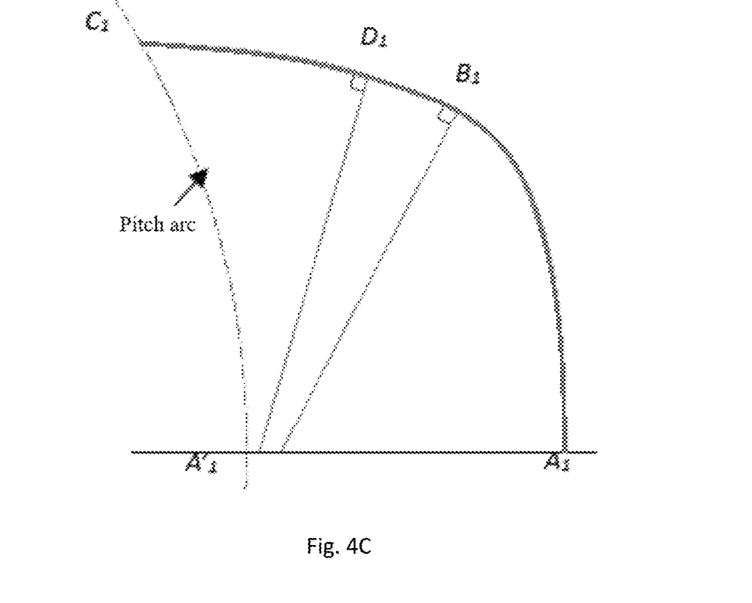
FIG. 4C is a schematic diagram of a curve of the blade peak curve mapped on a pitch circle arc under local disengagement state.

If the mapping relationship of the points $B_1$ and $D_1$ on the blade peak curve to $B'_1$ and $D'_1$ on the pitch circle arc is applied to the whole blade peak curve, a curve in the same shape as the pitch circle arc $A'_1C_1$ can be obtained. Particularly, the curve obtained through mapping may be just the pitch circle arc curve $A'_1C_1$, as shown in FIG. 4A, at this moment, the engagement of the rotors in rotation is good, and the closed volume cannot occur; curves obtained through mapping may also be overlapped, as shown in FIG. 4B, a curve section of the blade peak curve section $A_1B_1$ mapped to the pitch circle arc is $A'_1B'_1$, a curve section of the blade peak curve section $B_1D_1$ mapped to the pitch circle arc is $B'_1D'_1$, a curve section of the blade peak curve section $D_1C_1$ mapped to the pitch circle arc is $D'_1C'_1$, $B'_1D'_1$ in the mapped curve is an overlapped section, and the rotors will generate the closed volume when the point on this pitch circle arc rotates to a connecting line of rotating centers $O_1O_2$ of the two rotors; it is also possible that the point on a section of curve of the blade peak curve cannot generate this mapping relationship on the pitch circle arc, as shown by the blade peak curve section $B_1D_1$ in FIG. 4C, and at this moment, the rotors will be locally disengaged in the rotation process.

If the closed volume is required to be avoided, the total engagement of the rotors in the rotation process is required, and the constraint conditions for avoiding the closed volume of the rotor profile are deduced below:

It is known that an equation of the blade peak curve of the left rotor is:

$$\begin{cases} x_1 = x_1(t) \\ y_1 = y_1(t) \end{cases} \quad (10)$$

referring to FIG. 3, a normal line $B_1B'_1$ of the blade peak curve at the point $B_1$ is made, the coordinate of the point $B_1$ is set to be $(x_b, y_b)$, and a slope of the normal line is set to be $k_1$, then $$k_1 = -\frac{dx_1}{dy_1} = -\frac{dx_1}{dt} \cdot \left(\frac{dy_1}{dt}\right)^{-1}, \quad (11)$$

so an equation of the normal $B_1B'_1$ can be expressed as:

$$y_1 = k_1(x_1 - x_b) + y_b \quad (12).$$

By combining with the equation of the pitch circle arc, the equation of the curve mapped by the blade peak curve can be obtained:

$$\begin{cases} y_1 = k_1(x_1 - x_b) + y_b \\ x_1^2 + y_1^2 = R^2 \end{cases} \quad (13)$$

When the equation set is solved, only a value of $x_1$ needs to be solved, then, by combining with Formula (12), the equation of the curve mapped by the blade peak curve can be obtained.

Particularly, when an equation set (13) of the curve mapped by the blade peak curve is solved at this moment, the following conditions will be generated:

1. When $k_1 = \infty$, the normal line of the blade peak curve is perpendicular to an axis $x_1$, so $x_1 = x_b$.
2. When $k_1 \neq \infty$, the equation set may have no solution, one solution or two solution. Illustrations are respectively made for these three conditions below.

(1) When $(k_1^2+1)R^2 - (k_1x_b - y_b)^2 < 0$, the equation set has no solution, which corresponds to the case that the rotor profile locally disengaged.

(2) When $(k_1^2+1)R^2 - (k_1x_b - y_b)^2 = 0$, the equation set has one solution, which corresponds to the case that the point $B_1$ of the rotor profile will become a contact point of the two rotates at one and only one moment.

(3) When $(k_1^2+1)R^2 - (k_1x_b - y_b)^2 > 0$, the equation set has two solutions, in this case, in the rotation process, the point $B_1$ of the rotor profile meets the conditions of becoming the contact point of the two rotors at two moments. However, in the practical profile design process, according to the plus or minus of the slope $K_1$, only the point $B_1$ is enabled to become the engaged point of the two rotors at one moment, and generally, this point is closer to the point $B'$ than the other intersection point. Therefore, according to different slopes $K_1$, we can obtain the coordinate $x_1$ of the mapped curve as follows:

$$x_1 = \begin{cases} \dfrac{k_1(y_b - k_1x_b) + \sqrt{(k_1^2+1)R^2 - (k_1x_b - y_b)^2}}{k_1^2+1} & k_1 \geq 0 \\ \dfrac{k(y_b - k_1x_b) - \sqrt{(k_1^2+1)R^2 - (k_1x_b - y_b)^2}}{k_1^2+1} & k_1 < 0 \end{cases} \quad (14)$$

According to the rotor profile design requirements of avoiding local disengagement of the rotors and the closed volume, the above statements are converted into the following mathematical concepts:

1. The equation set (13) must have a solution.
2. In the solution of the equation set, $x_1$ must be a monotonically non-increasing function about t.
3. In the solution of the equation set, $y_1$ must be not smaller than zero.

That is:

$$\begin{cases} (k_1^2+1)R^2 - (k_1x_b - y_b)^2 \geq 0 \\ \dfrac{dx_1}{dt} \leq 0 \\ y_1 \geq 0 \end{cases} \quad (15)$$

Therefore, the design constraint conditions for avoiding the closed volume and the local disengagement of the rotors in the roots pump rotor profile design are obtained.

Step 3: Constraint conditions for avoiding undercutting are determined.

Figure 5:
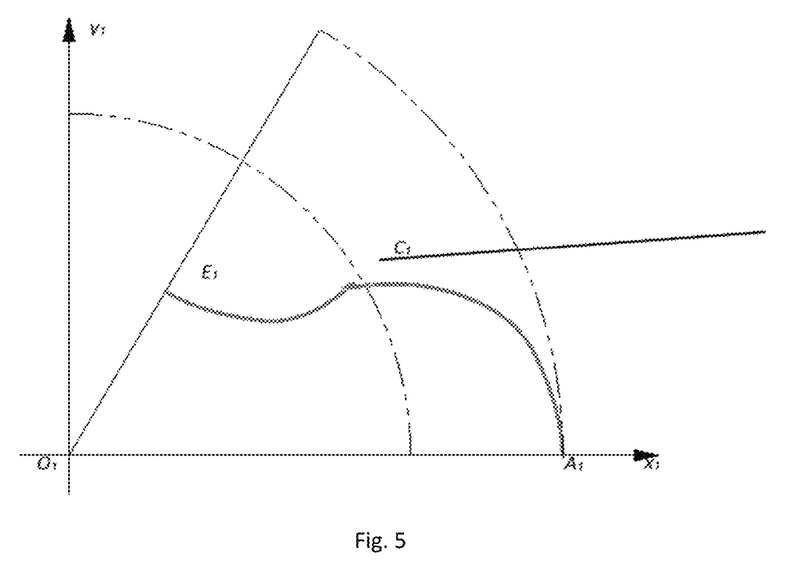
FIG. 5 is a schematic diagram of an undercutting phenomenon in the rotor profile.

In the design stage of the rotor profile, the rotor profile generating undercutting has obvious characteristics, i.e., a circling phenomenon will occur on the curve, as shown in FIG. 5.

Figure 6:
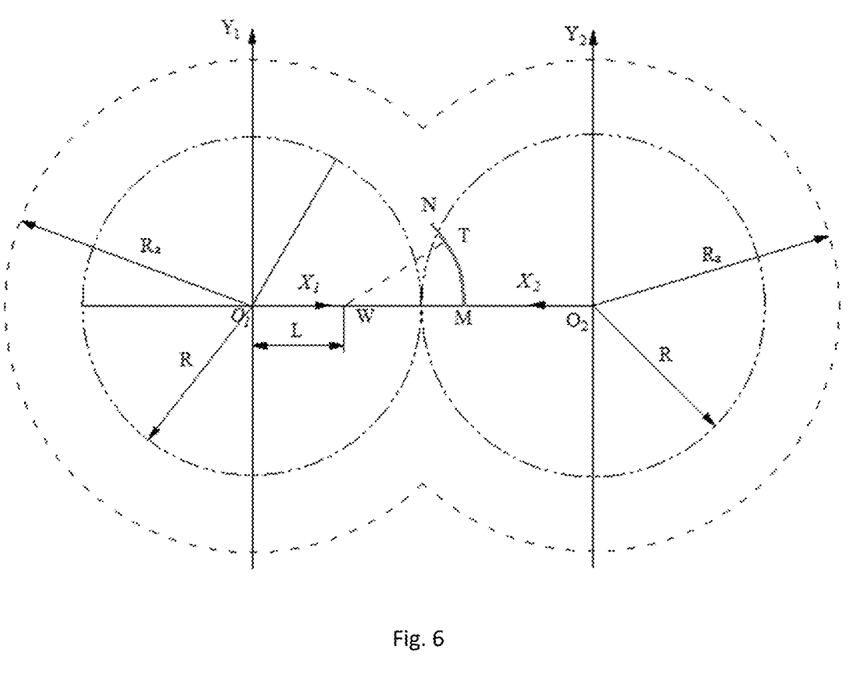
FIG. 6 is a schematic diagram of design constraints for avoiding undercutting.

As shown in FIG. 6, by passing an arbitrary point T on a line of action, a normal line TW of the line of action on this point is made, and intersects with $O_1O_2$ at a point W. According the condition of avoiding undercutting of gears in a gear engagement principle, it can be deduced that to avoid undercutting of the roots pump rotor profile, the following conditions must be met:

The intersection point W of the normal line of the arbitrary point T on the line of action and $O_1O_2$ must be positioned between rotating centers $O_1$ and $O_2$ of the two rotors. Therefore, to obtain the condition of avoiding undercutting during the design of the roots pump rotor profile, the coordinate of the point W mapped by the arbitrary point T on the line of action to $O_1O_2$ must be solved at first, and detected.

The line of action is a movement track of a section point when the two rotors are engaged and rotate. Therefore, by substituting Formula a·b=0 into Formula (1), the equation of line of action corresponding to the blade peak curve of the left rotor can be obtained. It should be noted that the tooth profiles of the two rotors are in tangential contact at each moment, and can be expressed as a mathematical expression a·b=0. In the formula:

a represents a normal vector of the rotor profile at the contact point.

b represents a relative sliding speed vector of the rotor profile at the contact point.

The slope of the normal line WT is set to be $k_2$, then $$k_2 = -\frac{dX_1}{dY_1} = \frac{dX_1}{dt} \cdot \left(\frac{dY_1}{dt}\right)^{-1}. \tag{16}$$

The coordinate $$\left(X_1 - \frac{Y_1}{k_2}, 0\right)$$

of the point W can be obtained, and the condition of avoiding undercutting can be converted into in equations:

$$\begin{cases} X_1 - \frac{Y_1}{k_2} \geq 0 \\ X_1 - \frac{Y_1}{k_2} \leq H \end{cases} \tag{17}$$

According to an line of action expression, the following formula can be obtained:

$$\begin{cases} \frac{dX_1}{dt} = x_1' \cos\varphi - x_1 \varphi' \sin\varphi + y_1' \sin\varphi + y_1 \varphi' \cos\varphi \\ \frac{dY_1}{dt} = -x_1' \sin\varphi - x_1 \varphi' \cos\varphi + y_1' \cos\varphi - y_1 \varphi' \sin\varphi \end{cases} \tag{18}$$

In the formula, $$x_1' = \frac{dx_1}{dt}, y_1' = \frac{dy_1}{dt} \text{ and } \varphi_1' = \frac{d\varphi}{dt}.$$

$\varphi$ is an angle of the right rotor of the roots pump. An envelope condition formula is deduced according to the relationship between the two engaged rotors.

Therefore, to calculate the slope $k_2$ of the normal line WT, the $\varphi$ must be further derived.

Figure 14:
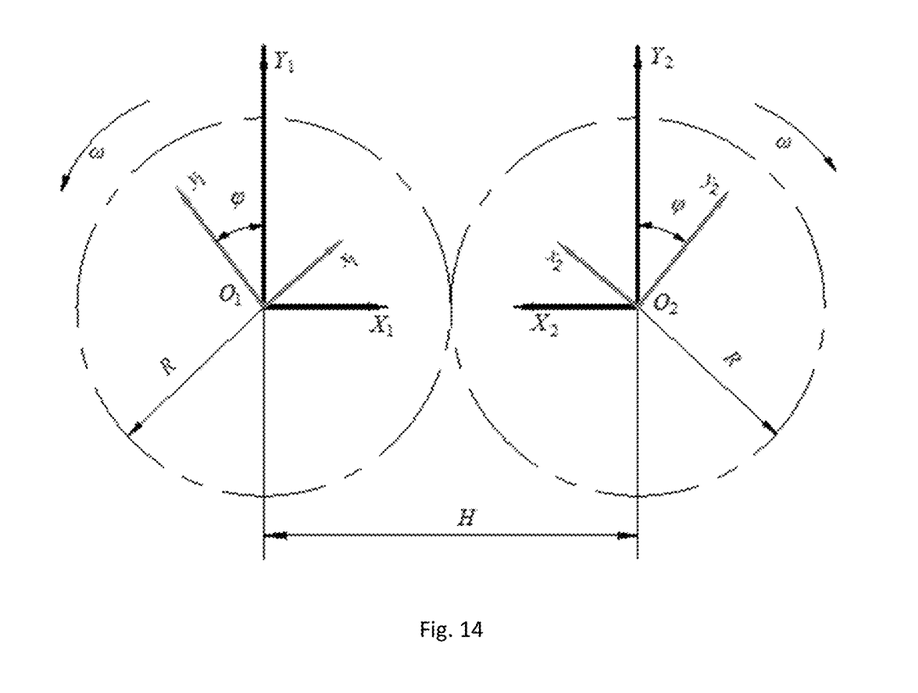
FIG. 14 is a coordinate relation diagram of a roots pump rotor.

Referring to FIG. 14, in a $\varphi$-t formula envelope condition expression (26), $$\varphi = \begin{cases} \arcsin\left(\frac{kx_1 x_1' + ky_1 y_1'}{H\sqrt{x_1'^2 + y_1'^2}}\right) - \arctan\left(\frac{x_1'}{y_1'}\right), & y_1 > 0 \\ \arccos\left(\frac{kx_1 x_1' + ky_1 y_1'}{H\sqrt{x_1'^2 + y_1'^2}}\right) + \arctan\left(\frac{y_1'}{x_1'}\right), & y_1 \leq 0 \text{ 且 } x_1' \geq 0, \text{ and} \\ \arccos\left(-\frac{kx_1 x_1' + ky_1 y_1'}{H\sqrt{x_1'^2 + y_1'^2}}\right) + \arctan\left(\frac{y_1'}{x_1'}\right), & y_1 < 0 \text{ 且 } x_1' < 0 \end{cases} \tag{26}$$

let $$m = \frac{2x_1 x_1' + 2y_1 y_1'}{H\sqrt{x_1'^2 + y_1'^2}} \text{ and } n = \frac{x_1'}{y_1'},$$

then a formula of $\varphi'$ can be further obtained:

$$\varphi' = \begin{cases} \frac{m'}{\sqrt{1-m^2}} - \frac{n'}{1+n^2}, & y_1' > 0 \\ \frac{-m'}{\sqrt{1-m^2}} + \frac{n'}{1+n^2}, & y_1' \leq 0 \text{ 且 } x_1' \geq 0. \\ \frac{m'}{\sqrt{1-m^2}} + \frac{n'}{1+n^2}, & y_1' < 0 \text{ 且 } x_1' < 0 \end{cases} \tag{19}$$

and
In the formula, $$m' = \frac{2[(x_1')^2 + x_1 x_1'' + (y_1')^2 + y_1 y_1'']}{H[(x_1')^2 + (y_1')^2]^{\frac{1}{2}}} - \frac{2(x_1 x_1' + y_1 y_1')(x_1' x_1'' + y_1' y_1'')}{H[(x_1')^2 + (y_1')^2]^{\frac{3}{2}}}, \text{ and}$$

$$n' = \frac{x_1'' y_1' - x_1' y_1''}{(y_1')^2}, x_1'' = \frac{d^2 x_1}{dt^2}, y_1'' = \frac{d^2 y_1}{dt^2}.$$

Therefore, the conditions of no undercutting during the design of the roots pump rotor profile can be obtained.

Step 4: A reasonable design region of the blade peak curve is obtained, and the design efficiency of the rotor profile is further improved.

It is specified that the rotor blade peak curves are all designed in a first quadrant and coordinate axes, and the starting points of the rotor blade peak curves are all designed on the axis $O_1x_1$.

Figure 7:
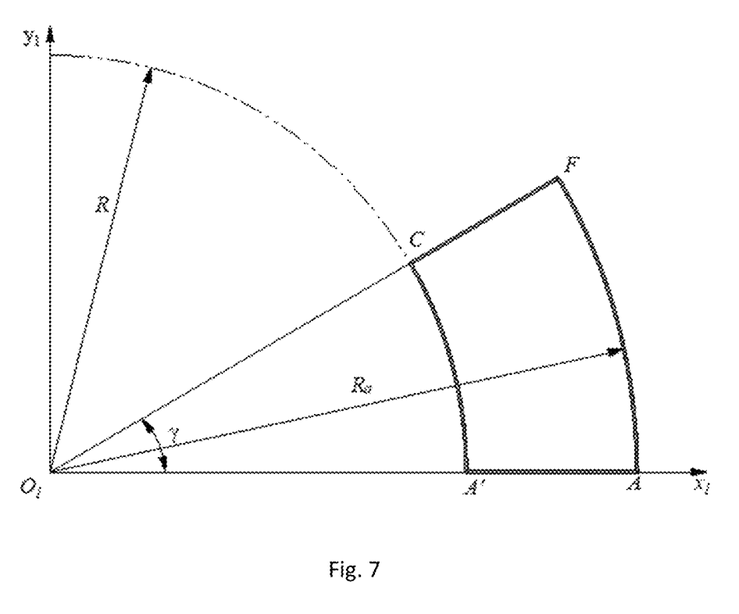
FIG. 7 is a schematic diagram of a basic design region of rotor profile design.

As shown in FIG. 7, due to the layout characteristics of the self position of the rotor blade peak curve, the blade peak curve must be positioned at the right side of the pitch circle arc A'C, at the left side of a tip arc $O_1AF$, above a line section A'A, and under a line section CF. The basic design region of the blade peak curve can be easily obtained:

1. The blade peak curve is positioned at the right side of $O_1A'C$:

$$x_1^2 + y_1^2 \geq R^2, \text{ and } x_1 \in \left[R\cos\frac{\pi}{2Z}, R\right]. \tag{20}$$

2. The blade peak curve is positioned at the left side of $O_1AF$:

$$x_1^2 + y_1^2 \leq R_a^2, \text{ and } x_1 \in \left[R_a\cos\frac{\pi}{2Z}, R_a\right]. \tag{21}$$

3. The blade peak curve is positioned above the line section A'A:

$$y_1 \geq 0 \tag{22}.$$

4. The blade peak curve is positioned under the line section:

$$y_1 - \tan\frac{\pi}{2Z} * x_1 \leq 0, \text{ and } x_1 \in \left[R\cos\frac{\pi}{2Z}, R_a\cos\frac{\pi}{2Z}\right]. \tag{23}$$

Figure 8:
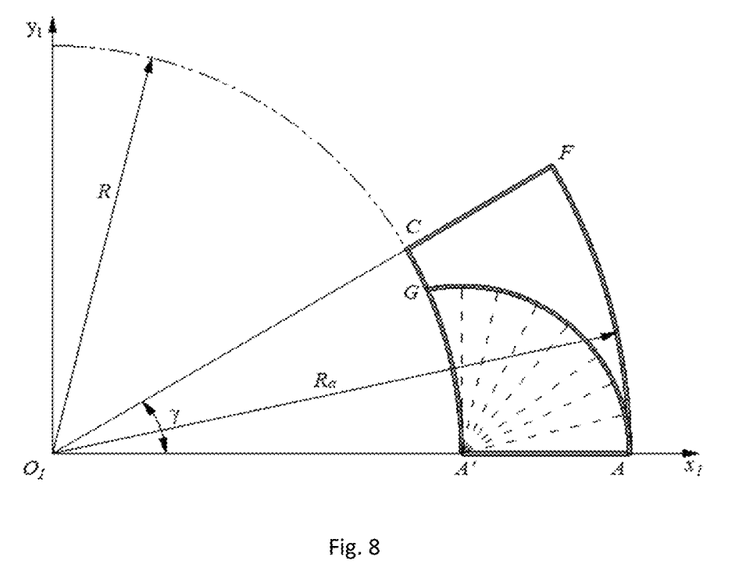
FIG. 8 is a schematic diagram of determining a lower boundary of a basic region of the rotor profile design.

The rotor blade peak curve and the corresponding pitch circle section have a mapping relationship. Theoretically, after the blade peak curve is mapped to the pitch circle arc section, a complete pitch circle arc section can be just obtained. If the curves obtained through mapping are overlapped, the closed volume will be generated. In order to avoid this condition, and deduce the condition to the limit, the curve obtained by mapping the blade peak curve is only one point. By considering the continuity requirement of the blade peak curve on a point A, the point obtained through mapping can only a point A', the blade peak curve meeting the condition is a pin tooth arc A'AG, and this is the lower boundary of the design of the blade peak curve, as shown in FIG. 8.

Figure 9:
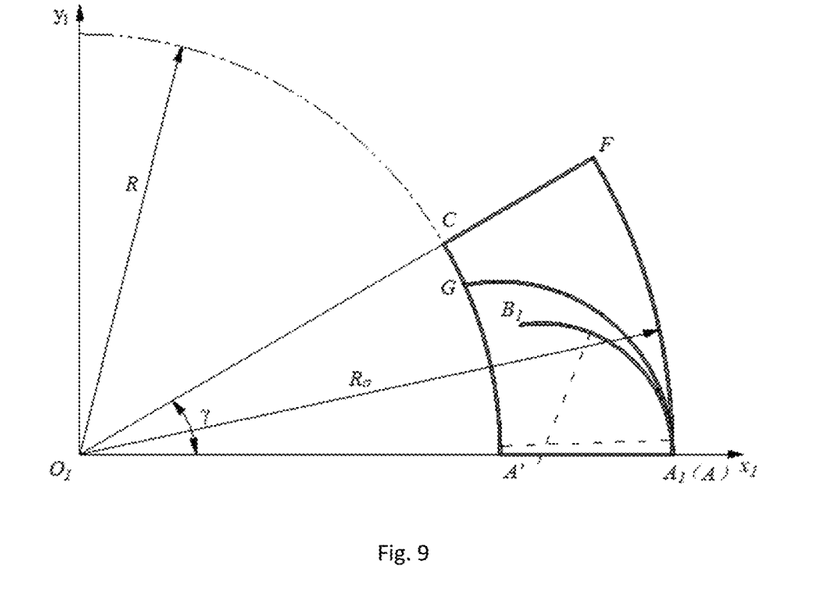
FIG. 9 is a schematic design diagram of designing a blade peak curve exceeding a lower boundary of a qualified region.

If the design of the blade peak curve exceeds the boundary defined by a pin tooth arc, the blade peak curve section is continuously compressed to the pitch circle arc A'AG, and a point having no mapping relationship with the pitch circle arc section necessarily exists on the curve of this section of tooth profile. As shown by the blade peak curve section $A_1B_1$ in FIG. 9, at this moment, the rotors will have a phenomenon of closed volume or local disengagement of the rotors during engagement. Therefore, this section of the pin tooth arc is the lower boundary of the design of the blade peak curve, and can be expressed as:

$$(x-R)^2 + y^2 \geq (R_a-R)^2, \text{ and } x \in [R, R_a] \tag{24}.$$

If the blade peak curve completely adopts the pin tooth arc, the ending point of the blade peak curve cannot reach a design ending point C. Therefore, if the pin tooth arc is used, the blade peak curve at least consists of two sections of curves. The closed performance and the continuity of the rotor profile necessarily constrain the design of the curve beyond a first section of the blade peak curve, so that the left boundary of the design region can be further reduced based on the lower boundary of the reasonable design region of the blade peak curve defined by Formula (24).

Figure 10:
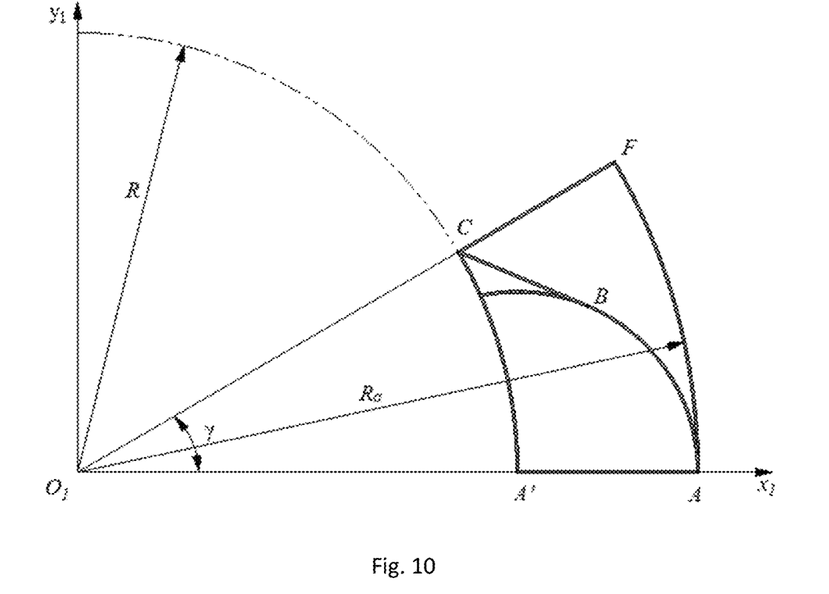
FIG. 10 is a schematic diagram of determining a left boundary of a basic region of rotor profile design.
Figure 11:
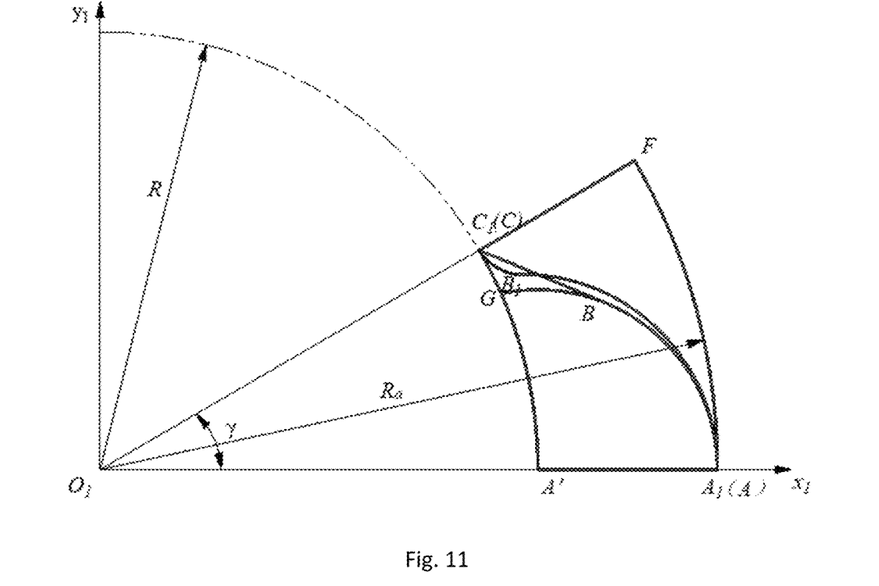
FIG. 11 is a schematic diagram of designing a blade peak curve exceeding a left boundary of a qualified region.

The closed performance of the rotors limits that the blade peak curves and the blade valley curves of the rotors are necessarily connected end by end, so that the blade peak curve necessarily passes through a point C. The continuity of the rotors limits that when there are a plurality of sections of blade peak curves, curves must be at least tangentially continuous. The study on the left boundary of the reasonable design region under the constraints of the two conditions will be changed into the study of the use length limitation when the pin tooth arc is used as the first section of curve of the blade peak curve section under the condition of ensuring the reasonable design of the second section of the blade peak curve. In order to meet the above requirements in the rotor profile design, and enable the use length of the pin tooth arc to be the longest at the same time, the only way is to make the curve section beyond the first section of curve be a straight line, as shown in FIG. 10. If the curve section designed by the blade peak curve exceeds a design boundary BC, as shown by the blade peak curve section $B_1C_1$ in FIG. 11, the curve bending direction change of the blade peak curve section is caused, so that the mechanical property of the rotors is greatly reduced.

The straight line can be used as the left boundary of the reasonable design region of the rotor profile, and can be expressed as follows by a mathematical expression:

$$\left(y - R\sin\frac{\pi}{2Z}\right) - k_3\left(x - R\cos\frac{\pi}{2Z}\right) \geq 0. \tag{25}$$

In the formula:

$$x \in \left[R\cos\frac{\pi}{2Z},\right.$$

$$\left.(Ra - R)\cos\left(\arcsin\left(\frac{R_a}{R} - 1\right) - \arcsin\left(\frac{-\sqrt{2 - 2\cos\left(\frac{\pi}{2Z}\right)}}{2}\right)\right) + R\right], \text{ and}$$

$$k_3 = \cot\left[\arcsin\left(\frac{-\sqrt{2 - 2\cos\left(\frac{\pi}{2Z}\right)}}{2}\right) - \arcsin\left(\frac{R_a}{R} - 1\right)\right].$$

Figure 12:
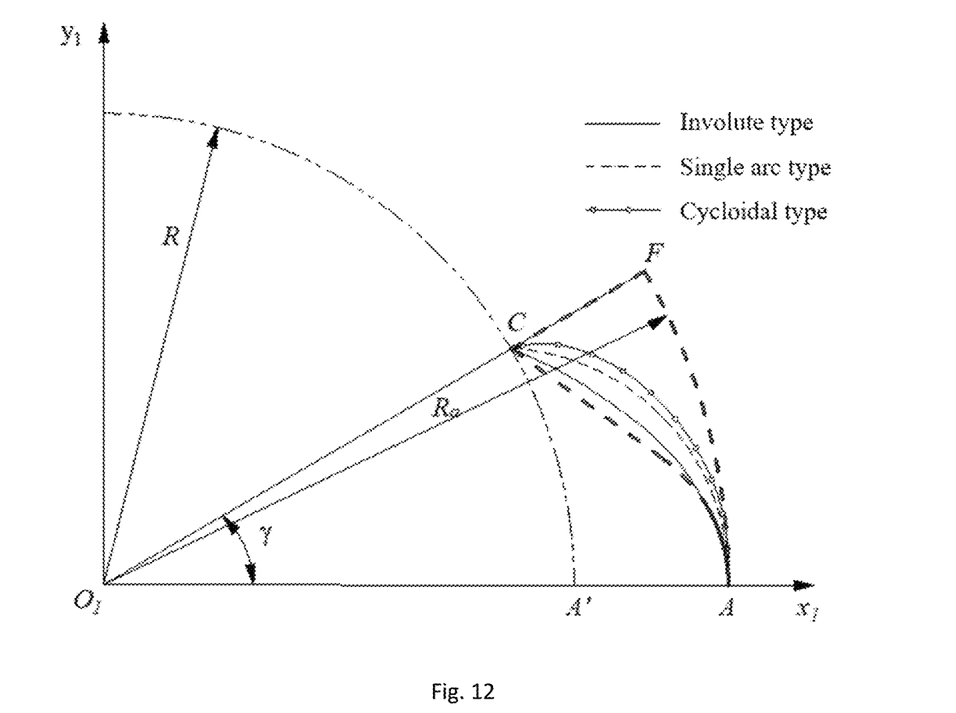
FIG. 12 is a schematic diagram of relationship between a typical rotor profile and a reasonable design region.

The reasonable design range of the blade peak curve is obtained through the above constraint conditions, as shown by a region marked with thick dash lines in FIG. 12. In the figure, the relationship of the blade peak curves of the arc type rotor profile, the cycloidal type rotor profile and the involute type rotor profile with the reasonable design range is marked at the same time. From the figure, it can be seen that the blade peak curves of several kinds of typical rotor profiles are all designed in a reasonable design region. It is worthy mention that the reasonable design range still has a further reduction possibility, particularly at the right boundary and the upper boundary of the reasonable design region.

Some steps in the embodiments of the disclosure may be implemented through software, and corresponding software programs may be stored in a readable storage medium, such as an optical disk or a hard disk.

The foregoing descriptions are merely preferred embodiments of the disclosure, but are not intended to limit the disclosure. Any modification, equivalent substitution, improvement and the like made within the spirit and principle of the disclosure shall fall within the protection scope of the disclosure.

What is claimed is:
1. A method comprising:
step 1: establishing a relation of a rotor profile of a roots pump and a performance parameter of the roots pump, wherein the performance parameter is a pumping rate of the roots pump, wherein the relation is expressed as:

$$s_{th} = 2V \cdot \frac{n}{60} \cdot 10^{-6} = 2 \cdot 10^{-6} \pi R_a^2 L \frac{n}{60} \lambda, \text{ and} \tag{3}$$

-continued $$\lambda = \frac{\pi R_a^2 - S_r}{\pi R_a^2}, \quad (4)$$

wherein $s_{th}$ is the pumping rate in units of liters per second of the roots pump; V is a volume of a medium discharged by the roots pump when one rotor of the roots pump rotates for a circle, in units of mm³; n is a rotating speed of the rotor, in units of revolutions per minute (rpm); λ is a rotor area utilization coefficient, which is unitless; $R_a$ is a rotor tip radius in units of mm; L is a rotor length, in units of mm; $S_r$ refers to an area of a single roots pump rotor, in units of mm²;

step 2: determining constraint conditions for avoiding a closed volume;

step 3: determining constraint conditions for avoiding undercutting; and step 4: determining range of a blade peak curve of the rotor profile based on the relation, the constraint conditions for avoiding the closed volume and the constraint conditions for avoiding undercutting;

wherein in step 2, the determining constraint conditions for avoiding the closed volume comprises:

taking an arbitrary point on the roots pump rotor blade peak curve to make normal line of the blade peak curve at the point, and setting a slope of the normal line to be k, the coordinate of an intersection point of the normal line and the pitch circle arc to be $(x_1, y_1)$, and $$\begin{cases} x_1 = x_1(t) \\ y_1 = y_1(t) \end{cases} ; \text{ and} \quad (10)$$

making a normal line B1B'1 on a point B1 on the blade peak curve, and setting the coordinate of the point B1 is $(x_b, y_b)$, then the constraint conditions for avoiding the closed volume being:

$$\begin{cases} (k_1^2 + 1)R^2 - (k_1 x_b - y_b)^2 \geq 0 \\ \frac{dx_1}{dt} \leq 0 \\ y_1 \geq 0 \end{cases} \quad (15)$$

2. The method according to claim 1, wherein the single roots pump rotor has three teeth; wherein a formula for calculating the area $S_r$ of the single roots pump rotor is:

$$S_r = 6 S_b \quad (5),$$

wherein $S_b$ is an area of a half tooth of the rotor; for convenient calculation, the $S_b$ is divided into three regions for area calculation, the areas of the three regions are sequentially recorded as $S_1$, $S_2$ and $S_3$ from the center to the edge of the roots pump, and calculation formulas are as follows:

$$S_1 = \frac{x_e * y_e}{2} = \frac{(H - R_a)^2 \sin 4\gamma}{4}, \quad (6)$$

$$S_2 = \int_{x_e}^{x_c} g(x) dx = \int_{(H-R_a)\cos(2\gamma)}^{R\cos\gamma} g(x) dx, \text{ and} \quad (7)$$

$$S_3 = \int_{x_c}^{x_a} f(x) dx = \int_{R\cos\gamma}^{R_a} f(x) dx, \text{ so} \quad (8)$$

$$S_b = S_1 + S_2 + S_3 = \quad (9)$$
$$\frac{(H - R_a)^2 \sin 4\gamma}{4} + \int_{(H-R_a)\cos(2\gamma)}^{R\cos\gamma} g(x) dx + \int_{R\cos\gamma}^{R_a} f(x) dx,$$

in Formula 9, R is a pitch radius, and is half of a center distance H of two rotors of the roots pump; $(x_e, y_e)$ is a starting point coordinate of a blade valley curve, and $(x_c, y_c)$ is an ending point coordinate of the blade valley curve; the blade valley curve is connected to the blade peak curve, so that an ending point of the blade valley curve is a starting point of the blade peak curve, and $(x_a, y_a)$ is an ending point coordinate of the blade peak curve; and g(x) represents a function expression of the blade valley curve, and $f(x)$ represents a function expression of the blade peak curve; and γ is an included angle between connecting lines of the starting and ending points of the blade peak curve or the blade valley curve with a circle center of the pitch circle, the size of γ is relevant to a rotor tooth number Z, and a calculation formula is Formula (1):

$$\gamma = \frac{\pi}{2Z}. \quad (1)$$

3. The method according to claim 1, wherein in step 3, the determining constraint conditions for avoiding undercutting comprises:

at an arbitrary point of a line of action, making a normal line of the line of action on the point, and setting a slope of the normal line to be $k_2$, and the coordinate of an intersection point of the normal $O_1O_2$ to be $(X_1, Y_1)$, then the constraint conditions for avoiding undercutting being:

$$\begin{cases} X_1 - \frac{Y_1}{k_2} \geq 0 \\ X_1 - \frac{Y_1}{k_2} \leq H \end{cases}, \quad (17)$$

Wherein H is center distance of two rotors, and $O_1O_2$ is a connecting line of center points of the two rotors.

4. The method according to claim 3, wherein a left boundary of the blade peak curve for avoiding undercutting meets Formula (25), and x and y are respectively a transverse coordinate and a longitudinal coordinate of each point in the left boundary of the blade peak curve:

$$y - R\sin\frac{\pi}{2Z} - k_3\left(x - R\cos\frac{\pi}{2Z}\right) \geq 0, \quad (25)$$

in the Formula, $$x \in \left[R\cos\frac{\pi}{2Z}, \right.$$

-continued $$(Ra - R)\cos\left(\arcsin\left(\frac{R_a}{R} - 1\right) - \arcsin\left(\frac{-\sqrt{2 - 2\cos\left(\frac{\pi}{2Z}\right)}}{2}\right)\right) + R\Bigg], \text{ and}$$

$$k_3 = \cot\left[\arcsin\left(\frac{-\sqrt{2 - 2\cos\left(\frac{\pi}{2Z}\right)}}{2}\right) - \arcsin\left(\frac{R_a}{R} - 1\right)\right].$$

5. The method according to claim 4, wherein in step 4, the determining the design region of the roots pump rotor blade peak curve according to step 1 to step 3 comprises:
  drawing a region range of the roots pump blade peak curve according to the constraint conditions determined in step 1 to step 3.

6. The method according to claim 1, wherein the roots pump rotor profile comprises an arc type rotor profile, a cycloidal type rotor profile or an involute type rotor profile.

\* \* \* \* \*